Figures 1, 10:
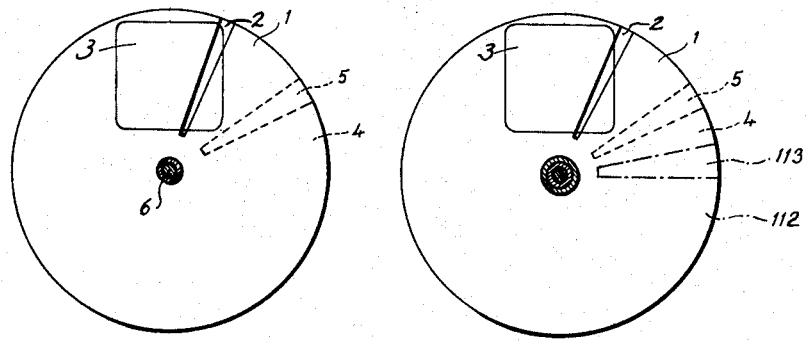

Dec. 17, 1963    H. J. C. NIEUWENHOVEN ETAL    3,114,306

FOCAL PLANE SHUTTERS

Filed March 31, 1959                            3 Sheets-Sheet 1

Dec. 17, 1963 H. J. C. NIEUWENHOVEN ETAL 3,114,306
FOCAL PLANE SHUTTERS
Filed March 31, 1959 3 Sheets-Sheet 3

# United States Patent Office 3,114,306
Patented Dec. 17, 1963

3,114,306
FOCAL PLANE SHUTTERS
Hendricus Jacobus Cornelis Nieuwenhoven, Rijswijk, and Albert Bouwers, The Hague, Netherlands, assignors to N.V. Optische Industrie "De Oude Delft," Delft, Netherlands, a corporation of the Netherlands
Filed Mar. 31, 1959, Ser. No. 803,167
Claims priority, application Netherlands Oct. 30, 1958
4 Claims. (Cl. 95—12.5)

The invention relates generally to photography and, more particularly, to an improved focal plane shutter for use in photographic cameras.

It is well-known in the art of photography that for establishing extremely short exposure times in the order of, for example, 1/500 of a second or less, use must be made of focal plane shutters as it is generally impossible to accelerate the moving parts of between-the-lens shutters rapidly enough to completely expose the lens aperture in a small fraction of the exposure times.

It has recently been proposed to use in a between-the-lens shutter a number of constantly rotating blades instead of the conventional intermittently moving blades which have definite rest positions and must be accelerated and stopped for each exposure. If high exposure speeds are to be obtained with this type of shutter the blades thereof must be given a relatively high rotational speed and means must be provided to prevent the shutter blades from exposing the lens aperture at each revolution. To this end a rotating disc having a circular aperture is mounted adjacent the elements in the path of the light rays such that an exposure may be made only once per revolution of the disc. Though this type of shutter is capable of somewhat higher exposure speeds than the conventional between-the-lens shutters it is relatively complicated in structure and does not afford a readily acceptable solution for small cameras and, for example, cameras having interchangeable lenses. Furthermore, it is not readily possible by means of this type of shutter to reduce the exposure time to values substantially below 1/1000 of a second.

Heretofore focal plane shutters have usually been made in the form of a flexible curtain having a slit, which curtain is longitudinally guided along the focal plane and capable of being rolled up to effect an exposure. It has not been possible to reduce exposure time to values far lower than 1/1000 of a second with the curtain type shutter without applying excessive tension to the curtain and causing serious vibrations of the camera.

It is a principal object of this invention to provide a focal plane shutter of rigid and relatively simple construction permitting extremely short exposure times, in a range of exposure times where each exposure is below 1/1000 of a second, to be obtained.

Another object of the invention is to provide a focal plane shutter capable of working at high exposure repetition frequencies in addition to short exposure times.

Still another object of the invention is to provide an improved focal plane shutter for use in a stereo-photographic camera.

Yet another object is in the provision, in a photographic camera, of an improved focal plane shutter and film driving assembly whereby entirely new results in the field of aerial photography may be obtained.

A feature of the focal plane shutter according to the invention is that it is provided with a set of two, coaxial circular discs mounted adjacent to and forward of the focal plane. The discs are rotatable about an axis perpendicular to and intersecting the focal plane at a point outside the effective image area. Each disc has a peripheral aperture extending radially inwardly. One of the apertures serves as an exposure aperture as it passes before the image area and its width increases linearly as it extends towards the periphery of the disc. The discs are rotatably driven at different speeds so related that the second aperture, during a certain time that the exposure aperture passes before the image area, allows light rays to pass on the focal plane whereas during a number of revolutions of the exposure aperture before and after this time the light rays are prevented from entering by the disc having the second aperture.

Figure 2:
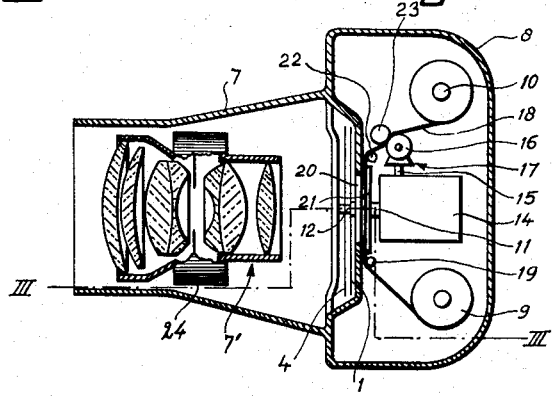
Figure 3:
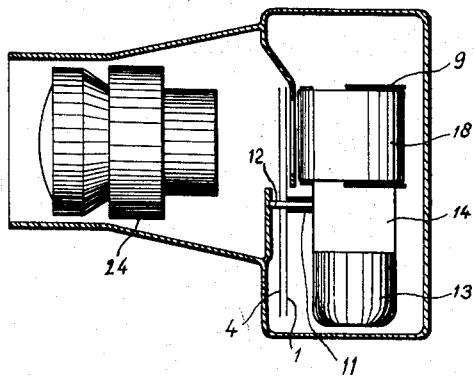
Figure 4:
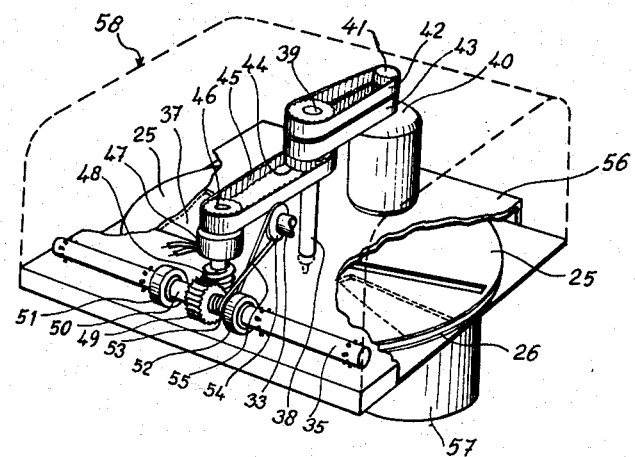
Figure 5:
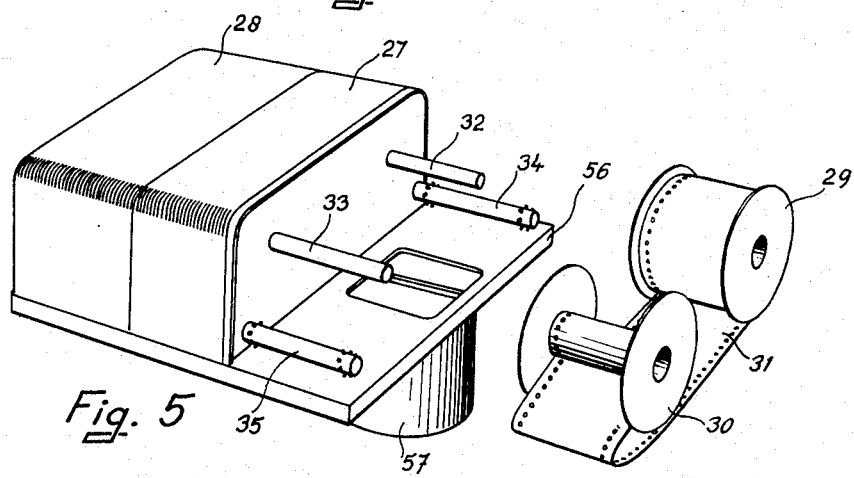
Figure 7:
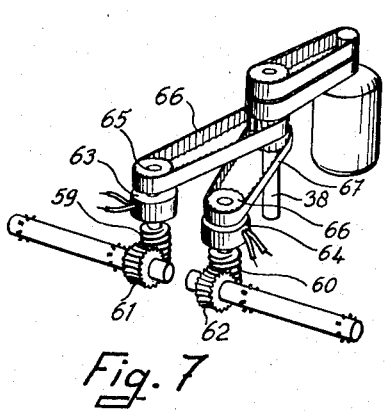
Figure 6:
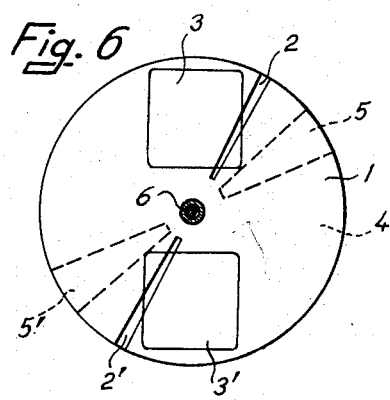
Figure 8:
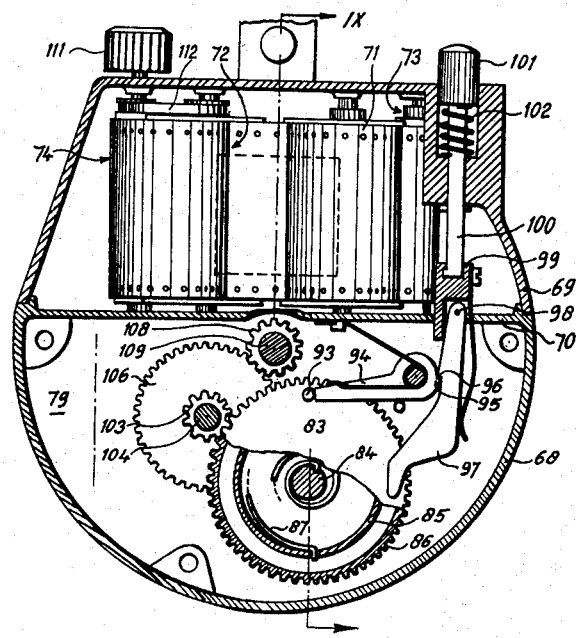
Figure 9:
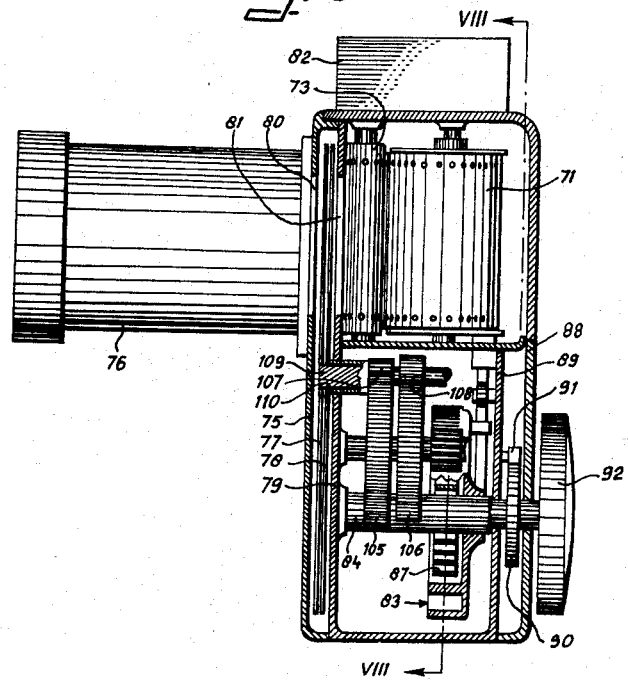

Other objects, features and advantages of the invention will be understood from the following description and claims in conjunction with the accompanying drawings which illustrate by way of example some embodiments of the focal plane shutter and associated mechanisms, and in which:

FIG. 1 is an elevation view of the focal plane shutter discs according to the present invention viewed from the focal plane, FIG. 2 is a schematic sectional elevation view of an aerial camera equipped with a focal plane shutter according to the invention, FIG. 3 is a schematic plan view partly sectional taken along line III—III of FIG. 2, FIG. 4 is a perspective view of a stereo-photographic camera equipped with a focal plane shutter according to the invention, the cover of the camera body and some other parts being omitted to show the interior parts of the camera, FIG. 5 is a perspective view similar to that of FIG. 4, part of the camera cover being removed to show one of the film loops, FIG. 6 is an elevation view similar to FIG. 1 and is illustrative of a focal plane shutter of a twin camera, FIG. 7 is a perspective view of a driving mechanism for a twin camera alternative to the driving mechanism shown in FIG. 4, FIG. 8 is a cross-sectional view, taken along line VIII—VIII of FIG. 9, of a miniature camera having a spring-driven focal plane shutter according to the invention, FIG. 9 is a sectional view, taken along line IX—IX of FIG. 8, of the miniature camera shown in FIG. 9, FIG. 10 is a focal plane shutter arrangement alternative to the embodiment shown in FIG. 1 and having three rotating discs.

According to the drawings, in which similar parts have the same reference numeral, a disc 1 in FIG. 1 having a diameter of for example, 186 mm. has a sector-shaped, peripheral exposure aperture 2 extending radially inwardly and of such radial length that a gate defining an image area 3, may be exposed thereby. The aperture is bounded by an angle of 3°. Hence, when the disc 1 is rotated at a speed of, for example, 10,000 revolutions/minute about an axis 5 an exposure time of 50μ sec. is obtained. An exposure time of 1/1000 of a second requires a speed of only 500 revolutions per minute. Thus, it is apparent that exposure times in the range of from about 1000 microseconds down to about 50 microseconds or even lower are obtainable with this arrangement, as constant rotating speeds up to 10,000 rev./min. may be established very well in practice.

In order to prevent the film from being exposed at each revolution of disc 1 a second disc 4 is provided axially spaced from disc 1 and disposed in front of it. Disc 4 is rotatable about the same axis as the disc 1 and is driven at a different speed which may be higher or lower than that of disc 1. In disc 4 a sector-shaped aperture 5 is provided and is bounded by an angle or arc which is larger than that of sector 2 in disc 1. If it is assumed that disc 1 is rotated at 9000 revolutions/minute and disc 4 at 8100 revolutions/minute it is clear that once in 10 revolutions of disc 1 the sector 2 is in correspondence with the sector 5 in disc 4. If the discs 1 and 4 have been well adjusted this correspondence will occur during the time the exposure aperture 2 is in correspondence or alignment with the image area and, accordingly, an exposure is made. In the case described the aperture 5 in disc 4 must cover an angle of about 12° in order to make sure that the aperture 2, which determines the exposure time, is free during the complete exposure time, whereas at the next revolution aperture 2 is completely covered again by the disc 4.

In FIGS. 2 and 3 a camera lens hood 7 carries a lens system 7'. This lens hood is attached to a camera body 8, in which film spools 9 and 10 and the driving mechanism for the film and the shutter discs 1 and 4 are housed. The camera shown is an aerial camera of a type adapted to take a series of rapid successive exposures taken at high aeroplane speeds and a low flying altitude.

In cameras of this type two serious difficulties are encountered, namely, to prevent blurring of the image by the high image motion speed and to provide a high enough exposure repetition frequency necessary for obtaining overlapping pictures of the strip to be photographed. In the camera illustrated in FIGS. 2 and 3 these difficulties are overcome in a simple and reliable manner by applying a high speed focal plane shutter constructed in accordance with the invention and by advancing the film during the series of exposures through the image area at a substantially constant speed which is, preferably, somewhat higher than the speed of the image caused by the aeroplane speed. The film is advanced in the same direction as the movement of the image. Then, image motion and film speed will largely compensate each other and the blurring as determined by the extremely short exposure time will be minor.

If it is assumed that, with the shutter data mentioned above, the film is driven at a speed of 90 cm./sec. the successive exposures on the film will be separated by unexposed strips of 4 mm. If, furthermore, the plane is flying at an altitude of, for example, 150 feet and a speed of about 300 m./sec. and the camera objective has a focal length of ten centimeters then the image will be moving through the focal plane at a speed of about sixty cm./sec. As the exposure time is about 50 microseconds the resultant blurring is in the order of $$50.10^{-6}.30.10^{-4} = 15\mu$$

which is quite tolerable for the type of work involved. The successive pictures show terrain portions which overlap each other sufficiently.

Returning to FIGS. 2 and 3, the disc 1 is pivotally mounted close adjacent to the focal plane on a hollow shaft 11. Within this shaft there is provided a spindle 12 for disc 4. The driving mechanism is shown schematically as comprising a conventional electric motor 13 coupled to a power distribution box 14 from which the shafts 11 and 12 of the shutter discs and a driving spindle 15 for a film sprocket roller 16 are driven. The connection between driving shaft 15 and roller 16 is established by a conical gear 17.

Between the film speed and the differential speed of the shutter discs on one hand, and the shutter speed on the other hand, a constant ratio may be maintained in general. If it is supposed that, by a change in flying speed $v$ or altitude $h$, or both, the speed ($v/h$)$f$ (where $f$ is the focal length of the camera) of the image in the focal plane is multiplied by a factor $k > 1$, the film speed and the repetition frequency must be multiplied by the same factor $k$, if the overlapping factor and the interspaces between successive pictures or exposures are to remain equal.

Consequently, the difference in speed between the image and the film is multiplied by the factor $k$ as well. It is evident that, in order to avoid an increase of the resultant blurring, the exposure time may preferably be divided by the factor $k$, which means that the rotational speed of disc 1 should be multiplied by the same factor $k$ as the film speed and the repetition frequency.

In this way, the construction of the driving mechanism can be very simple due to the fact that all driven parts may have a fixed mechanical coupling to this mechanism and there is no need that they be controlled individually. The control of the camera will consist merely in varying, by any conventional means, the speed of electric motor 13 proportionally to the quotient of the flying speed $v$ and the flying altitude $h$. Moreover, there is no need for a very precise measurement of the actual value of this quotient, as in the case of conventional cameras having image motion control, due to the fact that the extremely short exposures prevent the additional blurring caused by a possible inaccuracy.

It may be observed that in case a fixed relation exists between the various speeds concerned, the adaptation of the camera to the prevailing light conditions must be effected by the aid of the lens stop. Thus, the shortest exposure time is so chosen that under comparatively unfavorable light conditions on the envisaged type of film reasonable pictures can be made when the lens is at maximum aperture. Thereby, for given maximum image speed and overlapping factor, the blurring resulting from image and film speed is determined. With decreasing $v/h$-ratio the shutter and film speed are decreased proportionally to the image speed whereby the overlapping factor and the blurring remain constant. The lens is stopped down at the same time in order to correct for the increased exposure time.

Film 18 in FIGS. 2 and 3 is advanced longitudinally from the supply spool 9 over a guiding roller 19 towards the image area. Here, the film is drawn between a plane-parallel glass plate 20 and a back plate 21 spaced from the glass plate 20 a distance such that the film at all points of the image area is within the depth of field of the lens. The film is transported over a guiding roller 22 by a sprocket roller 16 cooperating with counter roller 23 and taken up at the take-up spool 10.

As shown diagrammatically in FIG. 2, the lens system 7' is provided with a shutter 24 of any known type by which means a series of successive exposures may be started and closed.

This shutter may be opened when the driving mechanism and the elements coupled thereto have attained the required speed and may be closed again as soon as sufficient exposures have been made. It will readily be understood that the function of a between-the-lens shutter such as 24 may alternatively be performed by an element which, in addition to the pair of shutter discs, is mounted in front of the focal plane and can be shifted, rotated or moved otherwise out of the light beam during a series of exposures.

In FIGS. 4 and 5 a twin camera which may be used as a stereo-photographic camera is schematically shown as comprising a rectangular flat box 56 in which the shutter discs 25 and 26 are accommodated. A pair of lens tubes are mounted on one side of the box 56 of which only one, designated 57, is visible in the drawing, and a cover 58 forms a part of the camera body under which the film spools, the driving mechanism and other related apparatus not essential for the present invention are mounted. As seen in FIG. 5, this cover 58 forms a compartment 27 for the driving mechanism and comprises two easily detachable lids for the film compartments. One of the lids has been removed in FIG. 5 and the other is designated 28. The film 31 is drawn from a supply spool 29 to a take-up spool 30 by sprocket rollers 34 and 35, of which 35 is driven by the driving mechanism. It being understood that FIG. 5 is an exploded perspective view. Supporting shafts 32 and 33, for spools 29 and 30 respectively, project from a side wall of the camera body compartment in which the driving mechanism is housed. The driving force is supplied by an electric motor 40 of conventional design but preferably having a variable speed. On the shaft of this motor a pair of sprocket wheels (only one of which, designated 41, is visible in the drawing) are mounted. These sprocket wheels cooperate with toothed bolts 42 and 43, driving a pair of sprocket wheels mounted on the coaxial shafts 38, 39 of discs 25, 26, respectively. The diameters of the sprocket wheels are slightly different to insure that the rotational speeds of the discs have the required relation to each other, as described hereinbefore in connection with FIG. 1.

On shaft 38 another sprocket wheel 44 is provided which, by means of a toothed belt 45 drives a sprocket wheel 46. The latter wheel is connected through an electromagnetic coupling mechanism 47 to a worm 48 which drives a worm gear 49 on a shaft 50 having ball bearings 51 and 52. The end portions of this shaft 50, such as 35, form film driving sprockets, extending into the film compartments of the camera. In FIG. 4 of the drawing there is further illustrated for one half of the camera a simple means for driving the spindle 33 of take-up spool 30, consisting in wheels 53 and 54 on a shaft 49 and spindle 33, respectively, which are connected in driving relation by a crossed belt 55.

As is usual in apparatus of the type concerned this arrangement should hold the film tightly drawn between the feed sprocket rollers and the take-up spool and, to this end, the belt may easily slip with respect to either of the wheels 53 and 54. It will be understood that a second film strip (not shown) is mounted in compartment 28 and is advanced similarly to film strip 31.

The camera illustrated in FIGS. 4 and 5 is particularly adapted to make series of stereometric pictures from an aeroplane in a manner very similar to that described in connection with the camera of FIGS. 2 and 3. Thus, as a first possibility, motor 40 drives the discs 25 and 26 at predetermined speeds having a ratio such that the apertures in both discs are in correspondence with each other during one passage across the image area 36 of one of the objectives, and, after a number of revolutions appear at the same time before the field image 37 of the other objective. Assuming for instance that the discs run at 5500 and 6500 revolutions/min. it takes five and a half revolutions of the slower disc to have the apertures in correspondence before the opposed field image or image area and another five and a half revolutions to come into conjunction again in front of the first image area. After the electromagnetic coupling 47 has been actuated, by circuitry not shown, the films are drawn at constant speed through the focal planes.

Preferably, the motor 40 and the discs 25 and 26 will be rotatably driven during the whole flight and the electromagnetic coupling 47 will be switched on each time a series of exposures is to be made. At the same time as the coupling 47 is actuated a pair of between-the-lens shutters, not shown, in the camera objectives may be actuated so as to prevent incident light from entering the camera through the apertures in rotating discs 25 and 26 as long as no exposures are to be made. It will be understood that with coupling 47 energized overlapping pictures are obtained on both film strips whose stereoscopic base is equal to the distance flown by the aeroplane during five and a half revolutions of the slower disc.

Alternatively, however, the arrangement may be such that both of the image areas are swept by the apertures during one and the same revolution. Assuming, as in connection with FIG. 1, that the discs run at speed of 8100 and 9000 revolutions/min. the widest aperture must cover an angle of about 40°, with an exposure aperture of 3°, in order to insure that the latter aperture is fully open during the time it passes before the image areas of both objectives and therebetween, whereas it is obstructed again by the second disc at the time it reaches the first image area during the next revolution. It is to be understood that, as corresponding pictures on both film strips are made during one and the same revolution of the disc, the stereoscopic base will be much smaller in this case than in the case explained above.

As illustrated in FIG. 6 it is also possible to construct the discs such that the corresponding exposures on both films are made exactly at the same time by each of the discs. Instead of only one aperture each discs has a pair of identical apertures radially opposite to each other. In FIG. 6 the parts having their equivalents in FIG. 1 are indicated by identical reference numerals and the additional parts are designated by primed reference numerals. If it is assumed that the disc 1 runs at 9000 and the other, 4, at 8500 revs./min., the apertures 5 and 5' in the slower disc will be in correspondence with each of the apertures 2 and 2' respectively in the other disc 500 times per minute so that the total number of exposures made on both films will amount to 1000 per minute. It will be understood that in this case the stereoscopic base is reduced to the distance between the two lenses of the camera.

In the perspective view of FIG. 7 an alternative film driving arrangement is shown, for use in a camera of the type illustrated in FIGS. 4 and 5. According to FIG. 7 the films may be driven independently. Thus, for each of the film driving sprockets individual sets of worms 59 and 60 and worm wheels 61 and 62 are provided instead of the single worm and worm wheel arrangement 48, 49 of FIG. 4. The worms 59 and 60 in FIG. 7 are mounted on shafts which, through individual electromagnetic couplings 63 and 64, sprocket wheels 65 and 66 and toothed belts 66 and 67 derive rotational force from individual sprocket wheels on shaft 38. Accordingly, one may load identical films in the camera and make stereoscopic pictures as described above by driving both films at the same time. Alternatively, identical films may be exposed one after the other by energizing couplings 63 and 64 alternatively. It is also possible, however, to have different films (f.i. films of different sensitivity or black-and-white and color film) placed in the camera of which alternative use is made.

It may be indicated here that, of course, for making stereoscopic pictures it is not indispensable to use a two-lens camera. With the one-lens camera described above, however, it is preferable to reduce the overlapping portions of successive pictures as much as possible in order to minimize the differential speed between the film and the image and the resulting blurring. On the other hand, of course, only overlapping portions of successive pictures made by a one-lens camera can be viewed stereoscopically. It is preferred, therefore, if stereoscopic work is aimed at, to use a twin camera as illustrated in FIGS. 4 to 7.

A miniature camera shown in FIGS. 8 and 9 is illustrative of the fact that the focal plane shutter according to the present invention may readily be adapted to small cameras for use in normal photographic work requiring extremely short or high speed exposures. The shutter in this case is provided with a manually wound spring motor and adapted to make single exposures.

The camera housing comprises two portions 68 and 69 of which the latter is detachable for the purpose of film loading. The interior of the camera is divided in two compartments by a partition or wall 70. The upper compartment houses the film supply and take-up spools 71 and 72, respectively, a film guiding roller 73 and a sprocket roller 74. Mounted on the front wall 75 of the housing is a lens tube 76. The lower compartment houses the spring motor and the gearing mechanism between this motor and the shutter disc shafts. The shutter discs 77 and 78 are confined in a separate compartment between the front wall 75 of the camera and a partition 79. Windows 80 and 81 in these walls allow the light rays to pass towards the focal plane of the camera. A view finder 82 of conventional design is placed on top of the portion 69 of the camera housing.

The spring motor comprises a spring drum 83 rotatably mounted on a wind-up shaft 84 and having an inner rim 85 to which one end of the coiled spring 87 is attached and an outer rim 86 which is provided with circumferential toothing. The other end of the spring is attached to the wind-up shaft. Between a rear wall 88 of the housing and a supporting partition 89 a ratchet 90 and pawl 91 are provided so as to prevent the spring 87 from turning shaft 84 back when it is wound up by means of the knob 92 on shaft 84.

Drum 83 further carries a pin 93 which, in cooperation with spring-loaded pawl 94 retains drum 83 in the position shown in FIG. 7 when the camera is in a rest position or when the spring 87 is wound up. A nose portion 95 on pawl 94 is in engagement with a hook portion 96 on a spring-loaded lever 97 which is pivotally connected at 98 to a longitudinally slidable member 99. This, in turn, is detachably connected to a shaft 100 of a push button 101 which in a rest position is held in an upward position by a spring 102.

The toothed outer rim 86 of drum 83 engages a gear 103 fixed on shaft 104 which further carries two gears 105 and 106 of slightly different diameter, which cooperate with two gears 107 and 108 mounted on the coaxial shafts 109 and 110 of the shutter discs 77 and 78 respectively. The gear ratio of the pair of gears 105 and 107 is higher than that of the gears 106 and 108 in accordance with the principle of the invention as outlined hereinbefore.

The camera is operated in a manner not much different from that of conventional roll film cameras. In the inoperative position of the camera the position of the shutter discs 77, 78, as determined by the stop pin 93, is such, that incident light is shut off from the film. The apertures in the disc are spaced apart by a considerable angle so as to insure that only after a number of revolutions of the shutter discs they will be in correspondence before the image area. The film is readied for exposure and positioned in correspondence with the image area by rotating knob 111 fixed to the sprocket roller 74 cooperative with the take-up spool 72 whose spindle is coupled to roller 74 by means of a belt 112. Then, the spring 87 is wound up by rotating a knob 92, fixed to the shaft 84, clock-wise until the desired force is attained. By varying the tension of spring 87 it is possible to vary the effective exposure time of the shutter.

When an exposure is to be made the push button 101 is pressed whereby the hook portion 96 on lever 97 rotates pawl 94 clock-wise. Consequently pawl 94 slips off of stop pin 93 and the spring 87 forces drum 83 to rotate clock-wise. When stop pin 93 passes the lower part of lever 97 it pushes the latter to the right whereupon portion 96 of the lever loses contact with nose 95 of pawl 94 and the pawl is free to return to the position shown. Thus, when drum 83 has made one revolution it is again stopped the pawl 94 engaging pin 93. The gear ratio between drum 83 and the shafts 109, 110 of the shutter discs is such that the latter by that time have made 11 and 10 revolutions respectively. Assuming that the exposure aperture in the rest position was before the image area and the other aperture was in the position opposite thereto the apertures will be in correspondence before the image surface after five and a half revolutions of the exposure apertures and the exposure takes place. Of course, there is a certain time delay between the actuation of push button 101 and the actual exposure. Due to the high speed of the discs this delay is very small, however, and does not give rise to difficulties in operating the camera. The remaining revolutions of the discs serve to restore the initial position of the shutter discs. To prepare the camera for the next exposure the film has to be conveyed one step and the shutter spring 87 must be rewound.

Finally, in the arrangement of FIG. 10 it is easy to demonstrate that by adding to a focal plane shutter as described in connection with FIG. 1 a third disc the repetition frequency of the shutter can be reduced to any value which may be desired. The three discs are designated 1, 4 and 112 and have apertures 2, 5 and 113 respectively.

The discs are mounted on coaxial shafts and are rotatably driven by suitable mechanism, not shown, at speeds of 9000, 8100 and 8250 revs./min. respectively. As discussed in connection with FIG. 1 aperture 5 will be passed by aperture 2 each tenth revolution of disc 1. However, in the arrangement of FIG. 10 only every sixth of these occurrences will result in an exposure due to the fact that aperture 113 is passed by aperture 2 every twelfth revolution. Hence, it will take sixty revolutions of disc 1 before correspondence of the three apertures is repeated and the repetition frequency will amount to 150 exposures per minute. The aperture 113 may cover an angle of about 10.5° in view of the slightly higher speed of disc 112, if compared with disc 4.

It will be apparent from the foregoing that many other arrangements, including such having four or even more shutter discs, may be designed to suit any requirements regarding shutter speed and number of exposures. Moreover, it is within the scope of this invention to impart an intermittent rotation to a disc like 112 so that it may act as an independent shutter element for starting and closing the operation of the focal plane shutter proper.

While preferred embodiments of the invention have been illustrated and described, it will be understood that the invention is in no way limited to these embodiments and that many changes may be made within the spirit and scope of the invention as defined by the following claims.

What we claim and desire to secure by Letters Patent is:

1. In an aerial camera for automatically taking a series of overlapping pictures from a flying airplane in rapid sequence on a driven roll film, in combination, an objective, means defining an exposure gate in the focal plane of said objective, a film drive mechanism to continuously advance the film in said focal plane, in operation, in the direction the image travels and across said exposure gate at a constant rate during and between successive exposures, means for adjusting the speed of movement of the roll film across said exposure gate so that it exceeds the speed of movement of the image due to the relative speed of the flying airplane and the terrain being photographed by a percentage at least equal to the percentage of overlap of said photographs thereby continuously overcompensating for image motion, and a focal plane shutter for periodically exposing the film in said focal plane at intervals at least equal to the time required for the film to traverse said exposure gate at said constant speed, said focal plane shutter comprising a pair of coaxial, axially spaced, adjacent, light-impervious, circular discs rotatably driven in parallel planes about a common axis extending perpendicular to said focal plane, said discs being disposed a short distance in front of said focal plane and each having a peripheral aperture extending radially inwardly to effectively expose the full height of said exposure gate when driven past said gate, the aperture in one of said discs diverging linearly toward the periphery of said one disc and being substantially narrower than the aperture in the other disc, means for rotatably driving the two discs in a common direction at different speeds having a fixed ratio to each other to periodically move said apertures concurrently past said exposure gate to cause periodic exposures of said film separated by time intervals during which each of the discs makes more than one revolution and an effective exposure time having a duration for each point in said exposure gate effective to limit the unsharpness caused by the overcompensation of said image motion.

2. In an aerial camera for automatically taking a series of overlapping pictures from a flying airplane in rapid sequence on a driven roll film, in combination, an objective, means defining an exposure gate in the focal plane of said objective, a film drive mechanism to advance the film, in operation, continuously in the direction the image travels and across said exposure gate at a constant rate during and between successive exposures, means for adjusting the speed of movement of the roll film across said exposure gate so that it exceeds the speed of movement of the image due to the relative speed of the flying airplane and the terrain being photographed by a percentage at least equal to the percentage of overlap of said photographs thereby continuously overcompensating for image motion, and a focal plane shutter for periodically exposing the film in said focal plane at intervals at least equal to the time required for the film to traverse said exposure gate at said constant speed, said focal plane shutter comprising means effective in operation to cause said exposure time to have a duration for each point in said exposure gate effective to limit the unsharpness caused by the overcompensation of said image motion.

3. In an aerial camera for automatically taking rapid sequences of overlapping photographs from a flying airplane on a driven roll film, in combination, an objective, means defining an exposure gate in the focal plane of said objective, a focal plane shutter comprising a pair of coaxial, axially spaced, adjacent, light-impervious, circular discs rotatably driven in parallel planes about a common axis extending perpendicular to the focal plane, said discs being disposed a short distance in front of the focal plane and each having a peripheral aperture extending radially inwardly to effectively expose the full height of the exposure gate when driven past said gate, the aperture in one of the discs diverging linearly toward the periphery of the disc and being substantially narrower than the aperture in the other disc, means for rotatably driving the two discs in a common direction at different speeds having a fixed ratio to each other to periodically move said apertures concurrently past said exposure gate to cause periodic exposures of said film separated by time intervals during which each of the discs makes more than one revolution, means cooperative with said shutter driving means to advance, in operation, continuously said roll film past said exposure gate at a constant speed having a fixed ratio to the rotational speeds of said shutter discs to thereby cause said roll film to travel during said intervals a fixed distance at least equal to the width of the exposure gate in the direction of film travel, said film advancing means comprising means for adjusting the speed of movement of said film across said exposure gate so that it exceeds the speed of movement of the image due to the relative speed of a flying airplane and the terrain being photographed by a percentage at least equal to the percentage of overlap of said photographs thereby continuously overcompensating for image motion, and the effective exposure time of said focal plane shutter for each point of exposure of said film in the focal plane being less than 1% of said intervals between subsequent exposures to effectively limit the unsharpness caused by the overcompensation for said image motion.

4. In a photographic camera, in combination, two objectives having parallel optical axes and a common focal plane, an exposure gate for each of said objectives in said focal plane, a focal plane shutter cooperative with each of said exposure gates and comprising a pair of coaxial, axially spaced, adjacent, light-impervious, circular, discs rotatably driven in parallel planes about a common axis extending perpendicular to the focal plane and between said objective axes, each disc having a peripheral aperture extending radially inwardly sufficiently to expose the full height of each of the exposure gates, one of the apertures diverging linearly in a direction towards the periphery of its disc and being narrower than the other, means for rotatably driving the two discs in a common direction at different speeds having a predetermined ratio to each other so that said apertures move in conjunction alternately past each of said exposure gates at times separated by intervals of equal duration during which each of said discs makes $n+\frac{1}{2}$ revolutions and $n$ being a different number for the two discs.

References Cited in the file of this patent
UNITED STATES PATENTS

| | | |
|---|---|---|
| 1,311,008 | Quick | July 22, 1919 |
| 1,586,071 | Cooke | May 25, 1926 |
| 2,460,163 | Bowen | Jan. 25, 1949 |
| 2,474,323 | Rattray | June 28, 1949 |
| 2,476,576 | Bachelder | July 19, 1949 |
| 2,713,814 | Sonne | July 26, 1955 |
| 2,742,834 | Kondolf | Apr. 24, 1956 |
| 2,772,941 | Hulcher | Dec. 4, 1956 |
| 2,950,663 | Warshawsky | Aug. 30, 1960 |

FOREIGN PATENTS

| | | |
|---|---|---|
| 524,231 | France | Mar. 10, 1921 |